(12) United States Patent
Na

(10) Patent No.: US 6,322,105 B1
(45) Date of Patent: Nov. 27, 2001

(54) BUS FRAME HAVING CENTER SPACE FRAME

(75) Inventor: Wook-jin Na, Ansung (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/611,614

(22) Filed: Jul. 7, 2000

(30) Foreign Application Priority Data

Dec. 31, 1999 (KR) .................................................. 99-68357

(51) Int. Cl.[7] .................................................. B62D 21/07
(52) U.S. Cl. ........................ 280/781; 280/792; 296/178
(58) Field of Search ..................................... 296/178, 196, 296/197, 203.01, 204, 205, 29, 30; 280/781, 792, 796, 797, 798, 800

(56) References Cited

U.S. PATENT DOCUMENTS

| | | | | |
|---|---|---|---|---|
| 2,139,807 | * | 12/1938 | Dayes | 180/291 |
| 2,189,139 | * | 2/1940 | Fox | 280/785 |
| 3,019,047 | * | 1/1962 | Ahrens | 296/178 |
| 4,353,313 | * | 10/1982 | Panagin | 105/397 |
| 5,863,070 | * | 1/1999 | Williams et al. | 280/781 |

FOREIGN PATENT DOCUMENTS

2714017 * 10/1978 (DE) ..................................... 280/781

* cited by examiner

Primary Examiner—Joseph D. Pape
Assistant Examiner—Paul Chenevert
(74) Attorney, Agent, or Firm—Christie, Parker & Hale, LLP

(57) ABSTRACT

The present invention relates to a bus frame having a center space frame capable of minimizing bending deformation at the portion where a center frame and a rear frame are connected to each other with first and second plates, thereby reducing any possible deformations in the entire bus frame. The bus frame according to the present invention includes a center space frame which comprises a center frame formed by a plurality of cross bars, reinforcing bars, and side bars disposed to a space, a plurality of plates connected to the reinforcing bars and side bars, and a reinforcing frame part constructed at a portion where the reinforcing bars and the plates are interconnected to reinforce a structural stiffness. The reinforcing frame part comprises a plurality of horizontal and vertical reinforcing beams to connect a plurality of reinforcing bars to each other, and the horizontal reinforcing beams are connected each other by an accessory vertical reinforcing beam.

3 Claims, 3 Drawing Sheets

BUS FRAME HAVING CENTER SPACE FRAME

BACKGROUND OF THE INVENTION

1. Filed of the Invention

The present invention relates to a bus frame, and more particularly to a bus frame having a center space frame to which front and rear frames are attached.

2. Description of the Prior Art

In general, a body and a frame of a bus are so long and bulky that it can be made of a plurality of parts, not a single large part. In other words, the body and the frame can be divided into three parts of front, center and rear frames which are separately manufactured and then welded together by an additional reinforcing material at all connecting portions.

As shown in FIGS. 4 and 5, a center frame 54 is installed between ⊂ or box-shaped front and rear frames 50, 51 to make box-shaped spaces with a plurality of cross bars 52 and side bars 53.

In addition, the front and rear frames 50, 51 are made of side members 55 which are oppositely disposed each other in the lengthwise direction of a vehicle and a plurality of cross members 56 which connect those side members 55 in the horizontal direction of the vehicle.

The side members 55 are connected to two plates 57 horizontally set up to make central spaces, and thus, the center frame 54 and the two plates 57 form a center space frame.

Meanwhile, a plurality of reinforcing bars 59 are arranged to form spaces between the two plates 57 and to keep stiffness, and the front and rear frames 50, 51 are respectively connected to the two plates 57, to thereby forming the bus frame.

However, there have been problems in the conventional bus frame in that the front, center and rear frames are connected only by the two plates set up upright to allow a heavy engine to be accommodated on the rear frame, thereby imposing an excessive load onto the plates which connect the center and rear frames, and readily causing deformations by bending load (P) and changing the shape of the entire bus frame.

SUMMARY OF THE INVENTION

Therefore, it is an object of the present invention to solve the aforementioned problems and provide a bus frame having a center space frame to minimize bending deformation at the plates which are connected for center and rear frames, thereby relieving any change possible to be made in the entire shape of the bus frame.

In order to accomplish the aforementioned object, there is provided a bus frame having a center space frame which comprises a center frame formed by a plurality of cross bars, reinforcing bars, and side bars disposed to a space, a plurality of plates connected to the reinforcing bars and side bars, and a reinforcing frame part constructed at a portion where the reinforcing bars and the plates are interconnected to reinforce a structural stiffness.

The reinforcing frame part comprises a plurality of horizontal and vertical reinforcing beams to connect a plurality of reinforcing bars to each other, and the horizontal reinforcing beams are connected each other by an accessory vertical reinforcing beam.

BRIEF DESCRIPTION OF THE DRAWINGS

Objects and aspects of the invention will become apparent from the following description of an embodiment with reference to the accompanying drawings in which.

DETAILED DESCRIPTION OF THE PRESENT INVENTION

Figure 1:
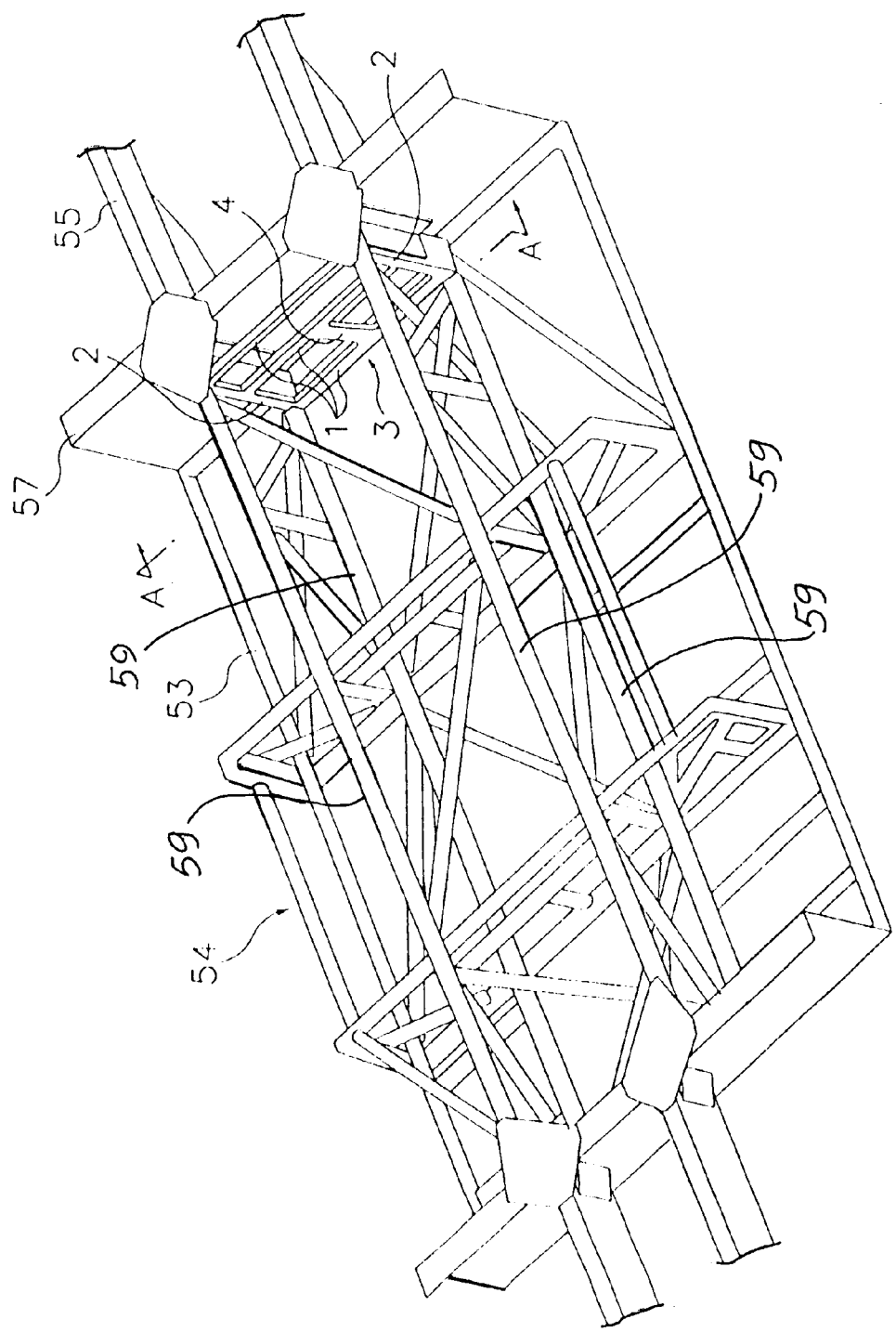
FIG. 1 is a perspective view for illustrating a center space frame for a bus frame in accordance with the present invention.
Figure 2:
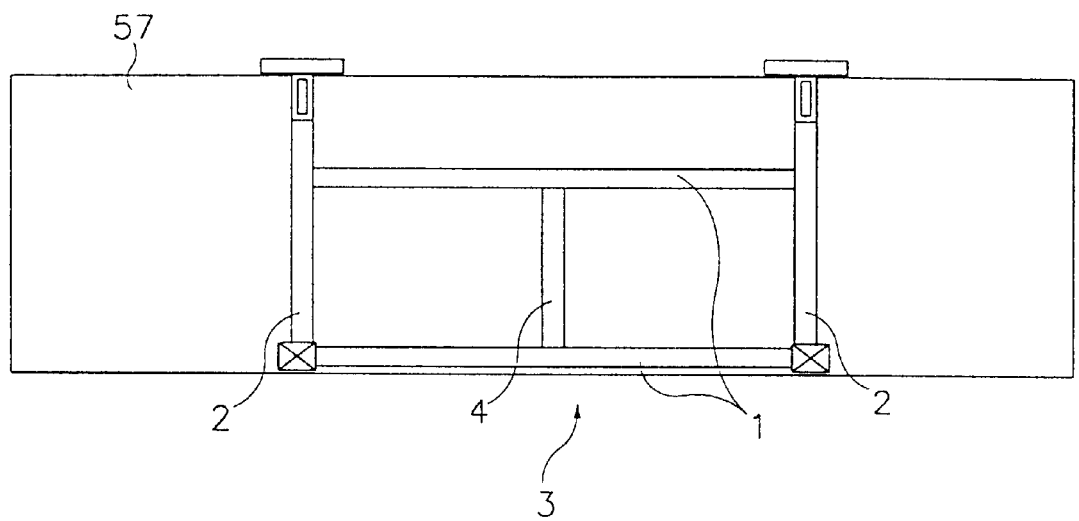
FIG. 2 is a cross-sectional view for illustrating the center space frame cut along line A—A shown in FIG. 2.

FIG. 1 is a perspective view for illustrating a center space frame for a bus frame in accordance with the present invention. FIG. 2 is a cross-sectional view for illustrating the center space frame cut along line A—A shown in FIG. 2. As shown in the drawings, a reinforcing frame part 3 is made by connecting a plurality of horizontal and vertical reinforcing beams 1, 2 between reinforcing bars 59 which form spaces of a center frame 54 by being connected with two plates 57.

In other words, if the reinforcing frame part 3 is formed at the portions, where the plates 57 and reinforcing bars 59 are connected, with a plurality of horizontal and vertical reinforcing beams 1, 2 to make a closed cross-section between reinforcing bars 59, the reinforcing frame part 3 can support the heavy load applied onto the rear frame 51 through the plates 57.

If the heavy load is applied to the reinforcing frame part 3, it is distributed and absorbed by a plurality of horizontal and vertical reinforcing beams 1, 2 coupled with the reinforcing bars in both horizontal and vertical directions, thereby preventing bending deformation at the portions where the plates 57 and reinforcing bars 59 are connected.

Particularly, in order to prevent a vertical deformation, an accessory vertical reinforcing beam 4 is positioned between the horizontal reinforcing beams 1.

The structural effect of the present invention thus constructed will be described below. After the center frame 54 is fabricated in the process of manufacturing the bus frame, reinforcing beams 1, 2 are horizontally and vertically welded at the portions where the plates 57 and reinforcing bars 59 are connected.

If the horizontal and vertical reinforcing beams 1, 2 are coupled in both horizontal and vertical directions, a rectangular cross-section is formed by the horizontal and vertical reinforcing beams 1, 2. Then, the accessory vertical reinforcing beam 4 is welded in the vertical direction between the horizontal reinforcing beams 1.

After the reinforcing frame part 3 is made between the plates 57 and the reinforcing bars 59, the plates 57 are connected with the front and rear frames 50, 51 to complete all the manufacturing processes of the entire bus frame.

At this time, if an engine (not shown) is accommodated on the rear frame 51, an excessive load is imposed onto the plates 57. However, the heavy load is distributed and absorbed by the reinforcing frame part 3, thereby minimizing possible bending deformation.

Figure 3:
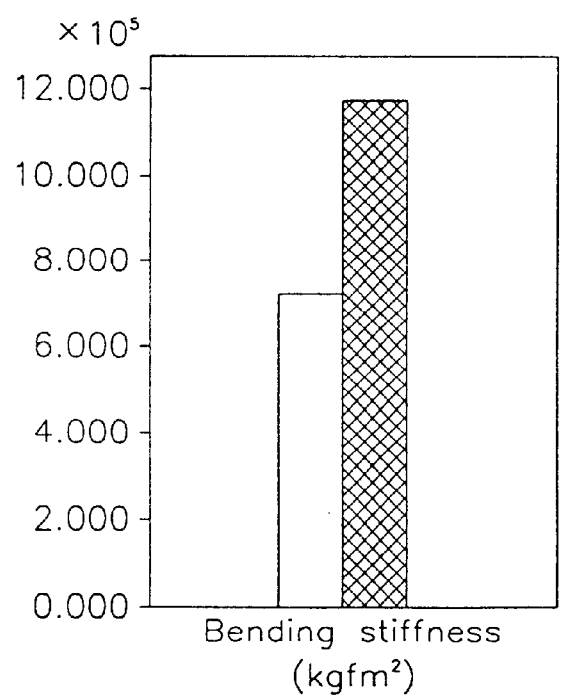
FIG. 3 is a graph for making a comparison in bending stiffness of a conventional bus frame and a bus frame of the present invention.
Figure 4:
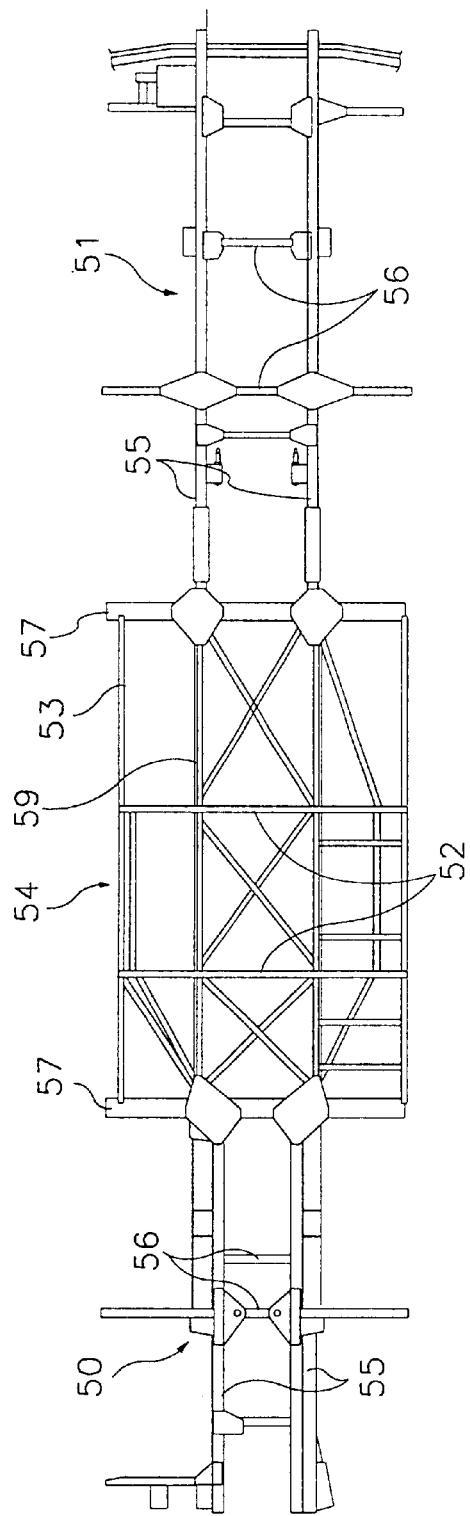
FIG. 4 is a plane view for illustrating a bus frame having a general center space frame.
Figure 5:
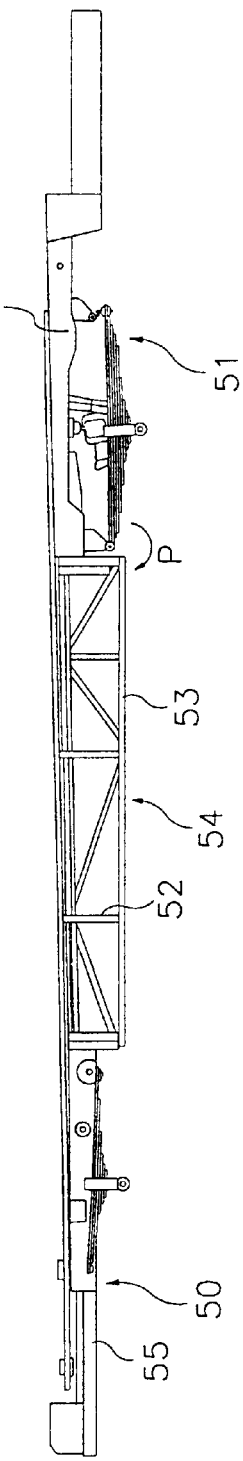
FIG. 5 is a lateral view for illustrating a bus frame having a general center space frame shown in FIG. 4.

As shown in the graph in FIG. 3, the bending stiffness of the conventional bus frame is $7.42 \times 10^5$ Kgfm$^2$, while the bending stiffness of the bus frame according to the present invention is $11.62 \times 10^5$ Kgfm$^2$. Therefore, the ratio of the bending stiffness of the conventional bus frame with respect to the bending stiffness of the bus frame according to the present invention is only about 63%.

As described above, in order to distribute and absorb the load imposed at the portions where the plates 57 and the reinforcing bars 59 of the center frame 54 are interconnected, an additional reinforcing frame part 3 is installed to reduce any possible bending deformation between the rear frame 51, where heavy matters like an engine and the like will be accommodated, and the center frame 54.

In other words, there are advantages in the bus frame of the present invention in that, when the center and rear frames to form spaces are connected with the plates, a reinforcing frame part made of a plurality of reinforcing members is installed to form a closed cross-section at the portions where the plates of the center frame and the side bars are connected, thereby minimizing the bending deformation that may be caused by heavy load imposed onto the rear frame and any possible deformation in the entire bus frame.

What is claimed is:

1. A bus frame having a center space frame which comprises a center frame formed by a plurality of cross bars, reinforcing bars, and side bars disposed to a space and a plurality of plates connected to the reinforcing bars and side bars, wherein the center space frame further comprises:

a reinforcing frame part constructed at a portion where the reinforcing bars and the plates are interconnected to reinforce a structural stiffness.

2. The bus frame, as defined in claim 1, wherein the reinforcing frame part comprises a plurality of horizontal and vertical reinforcing beams to connect a plurality of reinforcing bars.

3. The bus frame, as defined in claim 2, wherein the horizontal reinforcing beams are connected to each other by an accessory vertical reinforcing beam.

* * * * *